United States Patent [19]

Stinson

[11] 4,343,155
[45] Aug. 10, 1982

[54] RESERVOIR FILLING APPARATUS

[75] Inventor: Robert A. Stinson, Aurora, Ill.

[73] Assignee: Caterpillar Tractor Co., Peoria, Ill.

[21] Appl. No.: 245,247

[22] PCT Filed: May 23, 1980

[86] PCT No.: PCT/US80/00635
§ 371 Date: May 23, 1980
§ 102(e) Date: May 23, 1980

[87] PCT Pub. No.: WO81/03309
PCT Pub. Date: Nov. 26, 1981

[51] Int. Cl.³ .............................................. B60T 11/26
[52] U.S. Cl. ...................................... 60/586; 60/413; 91/517
[58] Field of Search ................ 91/514, 516, 517, 518, 91/532; 60/413, 418, 426, 464, 484, 585, 586, 587, 592

[56] References Cited

U.S. PATENT DOCUMENTS

| | | | |
|---|---|---|---|
| 2,820,343 | 1/1958 | Berthiez | 60/586 |
| 3,137,369 | 6/1964 | Stromberg | 60/586 |
| 3,713,295 | 4/1971 | Haak . | |
| 3,877,224 | 12/1973 | Johnson | 60/445 |
| 4,070,858 | 1/1978 | Hand | 91/516 |
| 4,174,018 | 11/1979 | Liebert | 91/532 |
| 4,215,720 | 8/1980 | Becker | 91/516 |

Primary Examiner—Abraham Hershkovitz
Attorney, Agent, or Firm—William B. Heming

[57] ABSTRACT

A hydraulic circuit (10) has a fluid supply source (12) to a work element, such as a control valve (14) for a work implement, connected by a first fluid pathway (18). A second work element (16), such as a master cylinder reservoir of a brake system, has a fluid level (36) which is desirably maintained against leakage in the system to prevent problems in using the brake system. The master cylinder reservoir (16) is associated with the hydraulic circuit (10) by apparatus (38,42) which initiate pressure conditions in fluid pathways (22,24) positioned in fluid communication with the master cylinder reservoir (16) to maintain the desired fluid level. The pressure conditions create a pressure differential which initiates or induces a fluid flow from the hydraulic circuit (10) to the master cylinder reservoir (16) to maintain the reservoir fluid level and substantially prevent undesirable braking characteristics which can result from an improper fluid level.

9 Claims, 2 Drawing Figures

4,343,155

RESERVOIR FILLING APPARATUS

DESCRIPTION

1. Technical Field

The invention relates to hydraulic circuits for maintaining a fluid level in an element of the circuit. More particularly, the invention relates to initiating a pressure differential through fluid pathways and across the element to maintain the fluid level.

2. Background Art

In hydraulic circuits leakage of the hydraulic fluid can be a problem, particularly when desired fluid levels must be maintained to insure proper and effective operation of work elements which depend upon a fluid supply contained in some type of accumulator, master cylinder or the like. For example, brake systems commonly have a master cylinder which has a reservoir containing a fluid supply for the closed circuit brake system. Optimum operation of the associated brakes requires that the fluid level in the master cylinder reservoir be maintained at a sufficient level to supply fluid throughout the hydraulic lines and other components as operation of the system expands or contracts the fluid volume of the system.

Leakage in the master cylinder or at other locations in the brake system is difficult to eliminate completely owing to the numerous components and connections between the components in the hydraulic circuits associated with such brake systems. Also, work vehicles which contain such brake systems are sometimes operated under harsh conditions which create vibration or can damage the brake system components and tend to promote leakage.

Under such conditions it may be desirable to draw supplemental fluid into the master cylinder reservoir to maintain the fluid level. A syphon or ejector device for supplementing fluid to cool brakes is shown in U.S. Pat. No. 3,101,815 which issued to J. W. Thompson et al on Aug. 27, 1963. Similar devices, utilized for other purposes, are also shown in U.S. Pat. No. 3,358,442 which issued to J. R. Cryder on Dec. 19, 1967, U.S. Pat. No. 3,713,295 which issued to Haak et al on Jan. 30, 1973, and U.S. Pat. No. 3,877,224 which issued to Johnson on Apr. 15, 1975.

Where supplemental fluid is provided to, for example, the master cylinder reservoir, the flow must be sufficient to maintain the level against reasonable leakage in the brake system. However, overfill can also create problems and, therefore, any supplemental fluid supply system preferably will be flexible enough to operate effectively under the potentially wide differences in leakage from brake system to brake system or in one brake system itself.

The present invention is directed to overcoming one or more of the problems as set forth above.

DISCLOSURE OF INVENTION

In one aspect of the present invention, a hydraulic circuit has a pressurized fluid source and a first fluid pathway in fluid communication with the fluid source and positionable in fluid communication with a second fluid pathway and a first work element. First means initiates a first pressure condition in a third fluid pathway. Second means initiates a second pressure condition in a fourth fluid pathway. A second work element is positioned in fluid communication with the third and fourth fluid pathways. A preselected fluid level in the second work element is maintained in response to a fluid flow initiated by the pressure conditions in the third and fourth fluid pathways.

The preselected fluid level represents, for example, the proper fluid level in a master cylinder reservoir of a brake system. By creating pressure conditions in fluid pathways which communicate with the master cylinder, a fluid flow is induced at a desired magnitude across its reservoir. The fluid is supplied from the first fluid pathway, which is used to pass fluid from the fluid source to the first work element, such as a hydraulic cylinder of an associated vehicle. The flow thus created is used to maintain the fluid level against leakage in the brake system to substantially overcome problems related thereto.

BEST MODE FOR CARRYING OUT THE INVENTION

Figure 1:
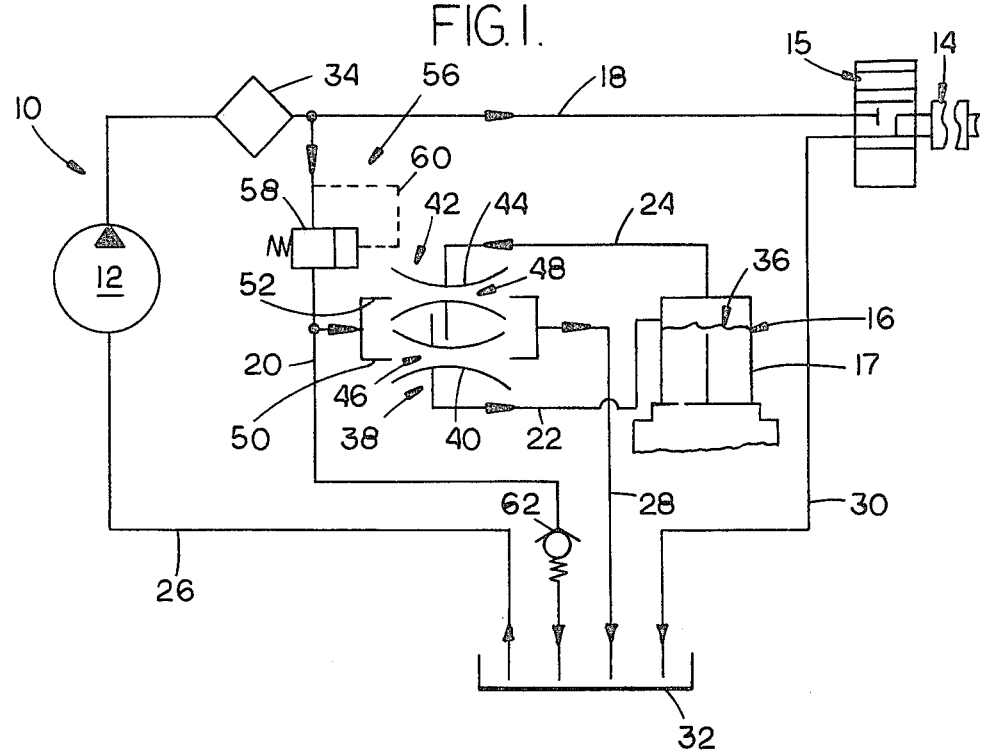
FIG. 1 is a schematic representation of one embodiment of the present invention showing a hydraulic circuit having venturis positioned between a fluid pathway and a work element to induce fluid flow to the work element.

Referring to FIG. 1, a hydraulic circuit 10 is shown which has a pressurized fluid source or pump 12 and first and second work elements 14,16. The first work element 14 is shown as a hydraulic cylinder operably connected to a control valve 15. The second work element is, for example, a master cylinder having a reservoir 17 and being associated with a brake system (not shown) of an associated vehicle to provide a fluid source for operation of the pressure actuated brakes. Fluid is passed in the hydraulic circuit through fluid pathways, which most commonly will be hydraulic lines interconnecting the various elements of the hydraulic circuit. For example, a first fluid pathway or supply line 18 is positioned in fluid communication with the pump, the control valve and a second fluid pathway or return line 20. The brake master cylinder reservoir is positioned in fluid communication with the return line, and thus the pump, through a third fluid pathway or fill line 22. The master cylinder is also positioned in fluid communication with a fourth fluid pathway or drain line 24. Additional fluid pathways 26,28,30 are utilized to position a tank 32 of the circuit in fluid communication with the pump, the return line and the control valve. Additionally, a filter 34 has been added in the supply line to filter fluid passing from the pump into the circuit. Such hydraulic circuit elements are well known in the art and are commonly arranged to provide various work functions on a work vehicle.

The reservoir 17 of the master cylinder 16 has a preselected fluid level denoted by reference numeral 36 which is maintained by the hydraulic circuit 10 in response to fluid flow initiated, preferably from the return line 20, through the fill and drain lines 22,24 by certain pressure conditions initiated in said fill and drain lines. The pressure condition in the fill line is initiated by first means 38, such as a first venturi 40, in response to a fluid flow in the return line and through the venturi. The pressure condition in the drain line is initiated by second means 42, such as a second venturi 44, in response to the above-mentioned fluid flow in the return line and through the second venturi.

Figure 2:
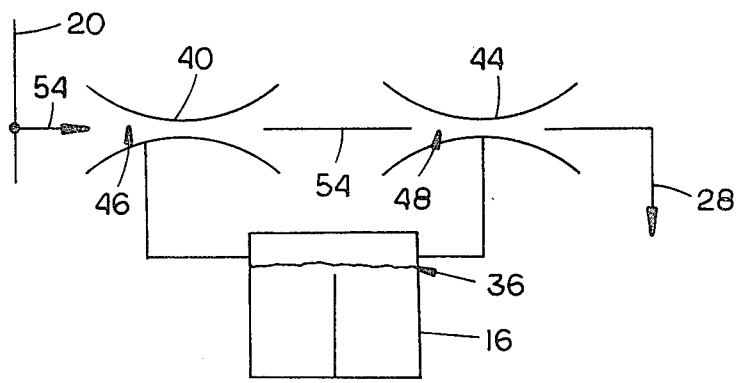
FIG. 2 is a schematic representation of another embodiment of the present invention showing a portion of a hydraulic circuit having the venturis of FIG. 1 in a different relationship.

Each of the venturis 40,44 has a respective throat opening 46,48 positioned in fluid communication with the return line 20 and the tank 32 and through or across which a portion of the fluid which passes through said return line is directed. For example, in FIG. 1, the throat openings are positioned in parallel fluid communication with the return line through parallel hydraulic lines 50,52 connected to the line representing the return line. The throat openings can also be positioned, in effect, in a series arrangement in which the throat opening of one of the first and second venturis is positioned in fluid communication with the return line through the throat opening of the other of the first and second venturis. Such an arrangement is illustrated in FIG. 2 where fluid from the return line passes through a line 54 interconnected with the return line and the first venturi to the throat opening of the second venturi.

In order to provide a complete fluid flow pathway from the return line 20 to the reservoir 17 of the master cylinder 16, the fill line 22 is positioned in fluid communication with the throat opening of the first venturi 40 at a preselected location on said throat opening. Thus, it will be seen that it is possible to induce a flow of fluid through the fill line to the master cylinder. Similarly, the drain line 24 is positioned in fluid communication with the throat opening 48 of the second venturi 44 at a preselected location on said throat opening to induce a pressure condition at which fluid will flow from the reservoir 17 to the tank 32 to complete the fluid path through the master cylinder.

Valve means 56, shown as a pilot operated relief valve 58, is provided for directing fluid from the supply line 18 through the return line 20 in response to a preselected fluid pressure level in the supply line. The pilot operated valve is spring biased to normally interrupt fluid flow from the supply line through the return line to the venturis 40,44. When the fluid pressure in the supply line is exerted at a sufficient magnitude through an associated pilot line 60 and against the spring bias, the valve moves to its open position at which fluid passes from the supply line toward the venturis. Additionally, a spring biased check valve 62 can be positioned in the return line and downstream of the pilot operated valve and the branch lines 50,52 or 54 interconnecting the venturis 40,44.

It should be understood that the hydraulic circuit, and particularly the individual components thereof, can be of other configurations as is known in the art without departing from the invention.

INDUSTRIAL APPLICABILITY

In the operation of the hydraulic circuit 10, the pump 12 provides a fluid flow through the supply line 18 in order to control actuation of, for example, the hydraulic cylinder 14 by the associated control valve 15. When fluid pressure in the supply line 18 is of a sufficient magnitude to cause the pilot operated valve 58 to move to the open position, fluid passes from the supply line and into the return line 20. Such fluid flow can be used to refill or replenish the fluid in the reservoir 17 of the master cylinder 16, which is part of the separately operable brake system. Refilling of the reservoir to maintain its preselected fluid level is desirable owing to leakage in the brake system which can reduce the fluid level in the brake system to an undesirable level for effective brake operation.

A portion of the fluid entering the return line 20 is provided to the venturis 40,44 through the branch lines 50,52 (FIG. 1) or 54 (FIG. 2) owing to resistance of the return line which creates a back pressure in said line. The spring biased check valve 62, where present, provides additional back pressure when line restrictions are not of sufficient magnitude in order to assure proper flow to the venturis.

The fluid in the return line 20 provided to the venturis 40,44 passes through their respective throat openings 46,48 and onto the tank 32. In passing fluid through the throat opening 46 of the first venturi 40, the first pressure condition is created in the fill line 22 owing to the relative location at which the fill line opens onto the throat opening. This pressure condition induces a fluid flow from the throat opening into the fill line. In other words, the venturi effect creates a positive pressure condition in the fill line which results in a fluid flow into the reservoir 17 of the master cylinder 16. With respect to the second venturi 44, the drain line 24 is positioned to open onto the throat opening 48 so as to create the second pressure condition in said drain line at a magnitude less than the first pressure condition. The resultant fluid pressure differential initiated across the reservoir tends to establish a siphoning effect from said reservoir into the drain line to remove any excess fluid through the drain line which is provided to the master cylinder from the fill line. The fluid pressure differential thus provides a continuous flow of fluid in the master cylinder reservoir, when the pilot control valve 58 is in the open position, to refill the master cylinder reservoir to its normal fluid level while also removing any excess fluid supplied to said reservoir.

It will be understood by those skilled in the art that the pressure differential will depend upon the locations at which the third and fourth fluid pathways open into their related throat openings and also upon the magnitude of fluid flow in the second fluid pathway. Only a positive pressure differential of the fill line relative to the drain line need be maintained, however, to establish the desired flow and siphon characteristics in the reservoir. In other words, for example, a positive pressure condition can be maintained in both the fill and drain lines 22,24 or a positive pressure condition can be maintained in the fill line with a negative or vacuum pressure condition in the drain line. Also, such reduced flow is desirably maintained at pressures close to atmospheric pressure in the system as disclosed to prevent pressurizing the brake system.

Other aspects, objects and advantages will become apparent from a study of the specification, drawings and appended claims.

I claim:

1. In a hydraulic circuit (10) having a pressurized fluid source (12), first and second fluid pathways (18,20) and a first work element (14), said first fluid pathway (18) being in fluid communication with said fluid source (12), and positionable in fluid communication with said second fluid pathway (20) and said first work element (14), the improvement comprising:

third and fourth fluid pathways (22,24);
  first means (38) for initiating a first preselected pressure condition in said third fluid pathway (22) in response to a fluid flow in said second fluid pathway (20);

second means (42) for initiating a second preselected pressure condition in said fourth fluid pathway (24) in response to said fluid flow in said second fluid pathway (20), said second pressure condition being of a magnitude less than said first pressure condition; and a second work element (16) having a reservoir (17) containing fluid at a fluid level, said reservoir (17) being positioned in fluid communication with said third and fourth fluid pathways (22,24), said fluid in said reservoir (17) being maintained at a preselected fluid level in response to a fluid flow initiated by said pressure conditions in said third and fourth fluid pathways (22,24) through said third fluid pathway (22) into said reservoir (17) and from said reservoir (17) into said fourth fluid pathway (24).

2. The hydraulic circuit (10), as set forth in claim 1, wherein said second work element (16) is positioned in fluid communication with said second fluid pathway (20) through said third fluid pathway (22) and said fluid level is maintained in response to said fluid flow being initiated from said second fluid pathway (20).

3. The hydraulic circuit (10), as set forth in claim 1, including valve means (56) for directing fluid from said first fluid pathway (18) through said second fluid pathway (20) in response to a preselected fluid pressure level in said first fluid pathway (18).

4. The hydraulic circuit (10), as set forth in claim 1, wherein said first means (38) is a first venturi (40) having a throat opening (46) and said third fluid pathway (22) is positioned in fluid communication with said throat opening (46) at a preselected location on said throat opening (46).

5. The hydraulic circuit (10), as set forth in claim 4, wherein said second means (42) is a second venturi (44) having a throat opening (48) and said fourth fluid pathway (24) is positioned in fluid communication with said throat opening (48) at a preselected location on said throat opening (48).

6. The hydraulic circuit (10), as set forth in claim 5, wherein said throat openings (46,48) of said first and second venturis (40,44) are positioned in parallel fluid communication with said second fluid pathway (20).

7. The hydraulic circuit (10), as set forth in claim 5, wherein the throat opening (46,48) of one of said first and second venturis (40,44) is positioned in fluid communication with said second fluid pathway (20) through the throat opening (48,46) of the other of said first and second venturis (40,44).

8. The hydraulic circuit (10), as set forth in claim 5, including a tank (32) and wherein said throat openings (46,48) of said first and second venturis (40,44) are each positioned in fluid communication with said tank (32).

9. A hydraulic circuit (10), comprising:

a tank (32);

a pressurized fluid source positioned in fluid communication with said tank (32);

a first work element (14) positioned in fluid communication with said tank (32);

a first fluid pathway (18) positioned in fluid communication with said fluid source (12) and said first work element (14);

a second fluid pathway (20) positioned in fluid communication with said first fluid pathway (18) and said tank (32);

a first venturi (40) having a throat opening (46) positioned in fluid communication with said second fluid pathway (20) and said tank (32);

a second venturi (44) having a throat opening (48) positioned in fluid communication with said second fluid pathway (20) and said tank (32);

a third fluid pathway (22) positioned in fluid communication with said throat opening (46) of said first venturi (40) at a preselected location in said throat opening (46);

a fourth fluid pathway (24) positioned in fluid communication with said throat opening (48) of said second venturi (44) at a preselected location in said throat opening (48);

a second work element (16) having a preselected fluid level and being positioned in fluid communication with said third and fourth fluid pathways (22,24), said preselected fluid level being maintained in response to fluid flow initiated through said third and fourth fluid pathways (22,24) by a fluid pressure differential between said preselected locations in said throat openings (46,48) of said first and second venturis (40,44).

* * * * *